US008319992B2

(12) United States Patent
Wei

(10) Patent No.: US 8,319,992 B2
(45) Date of Patent: Nov. 27, 2012

(54) APPROACH FOR PROCESSING LOCKED PRINT JOBS OBTAINED FROM OTHER PRINTING DEVICES

(75) Inventor: Ke Wei, San Jose, CA (US)

(73) Assignee: Ricoh Company, Ltd., Tokyo (JP)

( * ) Notice: Subject to any disclaimer, the term of this patent is extended or adjusted under 35 U.S.C. 154(b) by 1140 days.

(21) Appl. No.: 11/880,359

(22) Filed: Jul. 20, 2007

(65) Prior Publication Data

US 2009/0021778 A1 Jan. 22, 2009

(51) Int. Cl.
*G06F 3/12* (2006.01)
(52) U.S. Cl. ............... 358/1.15; 358/1.14; 358/1.18; 709/217; 709/223
(58) Field of Classification Search ........... 358/1.18, 358/1.14, 1.15; 709/217, 223
See application file for complete search history.

(56) References Cited

U.S. PATENT DOCUMENTS

| | | | |
|---|---|---|---|
| 5,633,932 A | 5/1997 | Davis et al. | |
| 5,845,066 A | 12/1998 | Fukuzumi | |
| 5,880,447 A | 3/1999 | Okada et al. | |
| 5,970,218 A | 10/1999 | Mullin et al. | |
| 6,161,139 A | 12/2000 | Win et al. | |
| 6,735,665 B1 | 5/2004 | Kumagai et al. | |
| 6,862,583 B1 | 3/2005 | Mazzagatte et al. | |
| 6,880,124 B1 | 4/2005 | Moore | |
| 6,938,154 B1 | 8/2005 | Berson et al. | |
| 6,970,259 B1 | 11/2005 | Lunt et al. | |
| 6,973,671 B1 | 12/2005 | Hsing et al. | |
| 7,002,703 B2 | 2/2006 | Parry | |
| 7,079,269 B2 | 7/2006 | Teeuwen et al. | |
| 7,110,541 B1 | 9/2006 | Lunt et al. | |
| 7,170,623 B2 | 1/2007 | Matoba et al. | |
| 7,224,477 B2 | 5/2007 | Gassho et al. | |
| 7,359,076 B2 | 4/2008 | Uchino | |
| 7,382,487 B2 | 6/2008 | Ikegami | |
| 7,450,260 B2 | 11/2008 | Takeda et al. | |
| 7,609,412 B2 | 10/2009 | Maruyama | |

(Continued)

FOREIGN PATENT DOCUMENTS

EP 0657 845 A2 11/1994

(Continued)

OTHER PUBLICATIONS

Claims, European patent application 07250426.9-1245, 3 pages.

(Continued)

*Primary Examiner* — Jacky X Zheng
(74) *Attorney, Agent, or Firm* — Hickman Palermo Truong Becker Bingham Wong LLP; Edward A. Becker

(57) ABSTRACT

An approach is provided for remotely processing locked print jobs. A printing device discovers other printing devices on a network that store locked print jobs. A user enters user identification data and the printing device displays the locked print jobs stored on the other printing devices that are associated with the user. The user selects a particular locked print job. The printing device requests the particular locked print job from the printing device that stores the locked print job and then processes the locked print job locally. An approach is also provided for a printing device to forward print jobs to other printing devices. The printing device discovers other printing devices on a network and the printing attributes of those printing devices. The printing device determines another printing device that is capable of processing a print job and forwards the print job to the printing device for processing.

14 Claims, 6 Drawing Sheets

U.S. PATENT DOCUMENTS

| | | | |
|---|---|---|---|
| 7,660,803 B2 | 2/2010 | Jin | |
| 7,667,865 B2 | 2/2010 | Ciriza et al. | |
| 7,697,760 B2 | 4/2010 | Kwok et al. | |
| 2001/0029521 A1 | 10/2001 | Matsuda et al. | |
| 2001/0038462 A1 | 11/2001 | Teeuwen et al. | |
| 2002/0002503 A1 | 1/2002 | Matsuoka | |
| 2002/0021902 A1 | 2/2002 | Hosoda et al. | |
| 2002/0023143 A1 | 2/2002 | Stephenson et al. | |
| 2002/0041394 A1 | 4/2002 | Aoki | |
| 2002/0054333 A1 | 5/2002 | Yamamoto et al. | |
| 2002/0059322 A1 | 5/2002 | Miyazaki et al. | |
| 2002/0097431 A1 | 7/2002 | Ikegami | |
| 2002/0120855 A1* | 8/2002 | Wiley et al. | 713/189 |
| 2003/0044009 A1 | 3/2003 | Dathathraya | |
| 2003/0065404 A1 | 4/2003 | Bhatti | |
| 2003/0090696 A1 | 5/2003 | Willis et al. | |
| 2003/0090697 A1 | 5/2003 | Lester et al. | |
| 2004/0019671 A1 | 1/2004 | Metz | |
| 2004/0056889 A1 | 3/2004 | Katano | |
| 2004/0088378 A1 | 5/2004 | Moats | |
| 2004/0090652 A1 | 5/2004 | Yoon | |
| 2004/0095595 A1 | 5/2004 | Jacobsen | |
| 2004/0118911 A1 | 6/2004 | Black et al. | |
| 2004/0125402 A1 | 7/2004 | Kanai et al. | |
| 2004/0140611 A1 | 7/2004 | Mui et al. | |
| 2004/0156068 A1 | 8/2004 | Yoshida et al. | |
| 2004/0165216 A1 | 8/2004 | Nauta | |
| 2004/0169884 A1 | 9/2004 | Yamada | |
| 2004/0196492 A1 | 10/2004 | Johnson et al. | |
| 2004/0239992 A1 | 12/2004 | Kawai et al. | |
| 2004/0257601 A1 | 12/2004 | Tomiyasu et al. | |
| 2004/0257613 A1 | 12/2004 | Okabe et al. | |
| 2004/0263870 A1* | 12/2004 | Itoh et al. | 358/1.1 |
| 2005/0039044 A1 | 2/2005 | Gassho et al. | |
| 2005/0046876 A1 | 3/2005 | Burget et al. | |
| 2005/0068547 A1 | 3/2005 | Negishi et al. | |
| 2005/0094195 A1 | 5/2005 | Sakamoto et al. | |
| 2005/0100378 A1 | 5/2005 | Kimura et al. | |
| 2005/0141013 A1 | 6/2005 | Kikuchi et al. | |
| 2005/0149755 A1 | 7/2005 | Shima et al. | |
| 2005/0152543 A1 | 7/2005 | Shima et al. | |
| 2005/0154884 A1 | 7/2005 | Van Den Tillaart | |
| 2005/0168769 A1 | 8/2005 | Kim et al. | |
| 2005/0182508 A1 | 8/2005 | Niimi et al. | |
| 2005/0182822 A1 | 8/2005 | Daniel et al. | |
| 2005/0183141 A1 | 8/2005 | Sawada | |
| 2005/0210253 A1 | 9/2005 | Shigeeda | |
| 2005/0213136 A1 | 9/2005 | Noyama et al. | |
| 2005/0229189 A1 | 10/2005 | McManus | |
| 2005/0254086 A1 | 11/2005 | Shouno | |
| 2005/0268089 A1 | 12/2005 | Kim et al. | |
| 2005/0273843 A1 | 12/2005 | Shigeeda | |
| 2005/0273852 A1 | 12/2005 | Ferlitsch | |
| 2005/0276618 A1 | 12/2005 | Clement et al. | |
| 2006/0017954 A1 | 1/2006 | Ly et al. | |
| 2006/0044589 A1 | 3/2006 | Nakagawaji | |
| 2006/0112270 A1 | 5/2006 | Erez | |
| 2006/0268315 A1 | 11/2006 | Randt | |
| 2006/0279760 A1 | 12/2006 | Wang et al. | |
| 2006/0279761 A1 | 12/2006 | Wang et al. | |
| 2006/0279768 A1 | 12/2006 | Wang et al. | |
| 2006/0285141 A1 | 12/2006 | Kim et al. | |
| 2007/0019224 A1 | 1/2007 | Okada et al. | |
| 2007/0091360 A1 | 4/2007 | Lizuka | |
| 2007/0139695 A1 | 6/2007 | Young et al. | |
| 2007/0146768 A1 | 6/2007 | Isoda | |
| 2007/0177920 A1 | 8/2007 | Katano et al. | |
| 2008/0030772 A1 | 2/2008 | Shirai | |
| 2008/0037052 A1 | 2/2008 | Nishiguchi | |
| 2008/0066185 A1 | 3/2008 | Lester et al. | |
| 2008/0114922 A1 | 5/2008 | Chou et al. | |
| 2008/0117452 A1 | 5/2008 | Murakami | |
| 2008/0189598 A1 | 8/2008 | Yoshida | |
| 2008/0201784 A1 | 8/2008 | Someshwar | |
| 2009/0147698 A1 | 6/2009 | Potvin | |
| 2009/0185223 A1 | 7/2009 | Kanai et al. | |
| 2009/0244594 A1 | 10/2009 | Nuggehalli | |
| 2009/0244595 A1 | 10/2009 | Kim | |
| 2009/0244596 A1 | 10/2009 | Katano | |
| 2009/0316183 A1 | 12/2009 | Wei | |
| 2010/0002248 A1 | 1/2010 | Nuggehalli et al. | |
| 2010/0002249 A1 | 1/2010 | Nuggehalli et al. | |
| 2010/0253968 A1 | 10/2010 | Nuggehalli | |
| 2010/0265529 A1 | 10/2010 | Katano | |
| 2011/0013219 A1* | 1/2011 | Nuggehalli et al. | 358/1.15 |
| 2012/0002234 A1 | 1/2012 | Wang | |
| 2012/0127504 A1 | 5/2012 | Nuggehalli et al. | |
| 2012/0140264 A1 | 6/2012 | Nuggehalli | |

FOREIGN PATENT DOCUMENTS

| | | |
|---|---|---|
| EP | 1 091 275 | 4/2001 |
| EP | 1 091 275 A2 | 4/2001 |
| EP | 1 143 695 | 10/2001 |
| EP | 1 143 695 A2 | 10/2001 |
| EP | 1 229 724 | 8/2002 |
| EP | 1 229 724 A2 | 8/2002 |
| EP | 1229724 | 8/2002 |
| EP | 1229724 A2 * | 8/2002 |
| EP | 12296724 A2 | 8/2002 |
| EP | 1 367 814 | 12/2003 |
| EP | 1 465 052 A2 | 10/2004 |
| EP | 1 566 719 A2 | 2/2005 |
| EP | 1 511 287 | 3/2005 |
| EP | 1 621 994 | 2/2006 |
| EP | 161994 A1 | 2/2006 |
| EP | 1621994 A1 * | 2/2006 |
| JP | 4235667 A | 8/1992 |
| JP | 6152814 A | 5/1994 |
| JP | H06095464 | 8/1994 |
| JP | 10207660 A | 8/1998 |
| JP | 2001067201 A | 3/2001 |
| JP | 2001125982 A | 5/2001 |
| JP | 2001217948 A | 8/2001 |
| JP | 2002007095 A | 1/2002 |
| JP | 2002175241 A | 6/2002 |
| JP | 2002199153 A | 7/2002 |
| JP | 2004181647 A | 7/2004 |
| JP | 2004287824 | 10/2004 |
| JP | 2005074772 A | 3/2005 |
| JP | 2005092731 | 4/2005 |
| JP | 2005178070 A | 7/2005 |
| JP | 2005196741 A | 7/2005 |
| JP | 2006231675 A | 9/2006 |
| JP | 2007055022 A | 3/2007 |
| JP | 2008-97115 | 4/2008 |
| WO | WO 00/68817 | 11/2000 |

OTHER PUBLICATIONS

European Patent Office, "Partial European Search Report", European patent application 07250426.9-1245, 5 pages.

European Patent Office, "European Search Report", EP application No. EP 07252112, dated Mar. 1, 2010, 6 pages.

European Patent Office, "European Search Report", application No. EP 09156641, dated Jul. 2, 2009, 8 pages.

Claims, European patent application 07250426.9-1245, 2 pages.

European Patent Office, "European Search Report", European patent application 07250426.9-1245, dated Jun. 12, 2008, 19 pages.

European Patent Office, "European Search Report", application No. EP 09 15 6660, dated Jul. 6, 2009, 7 pages.

European Patent Office, "European Search Report", European patent application EP 08 16 0705, dated Nov. 12, 2008, 10 pages.

European Patent Office, "European Search Report", in application No. 09164263.7, dated May 4, 2012, 6 pages.

U.S. Appl. No. 11/148,678, filed Jun. 8, 2005, Notice of Allowance, May 18, 2010.

U.S. Appl. No. 11/411,248, filed Apr. 25, 2006, Office Action, May 14, 2010.

U.S. Appl. No. 11/439,796, filed May 23, 2006, Notice of Allowance, Jun. 8, 2010.

U.S. Appl. No. 11/656,592, filed Jan. 22, 2007, Office Action, Jun. 26, 2010.

U.S. Appl. No. 12/423,933, filed Apr. 15, 2009, Office Action, Dec. 8, 2011.

U.S. Appl. No. 12/417,846, filed Apr. 3, 2009, Office Action, Jan. 11, 2012.
U.S. Appl. No. 12/144,549, filed Jun. 23, 2008, Office Action, Nov. 7, 2011.
U.S. Appl. No. 11/788,517, filed Apr. 20, 2007, Notice of Allowance, Oct. 3, 2011.
U.S. Appl. No. 13/396,401, filed Feb. 14, 2012, Office Action, May 7, 2012.
U.S. Appl. No. 12/166,741, filed Jul. 2, 2008, Notice of Allowance, Sep. 22, 2011.
U.S. Appl. No. 13/230,541, filed Sep. 21, 2011, Final Office Action, Apr. 25, 2012.
U.S. Appl. No. 12/144,549, filed Jun. 23, 2008, Notice of Allowance, Mar. 5, 2012.
U.S. Appl. No. 12/059,986, filed Mar. 31, 2008, Office Action, Mar. 15, 2012.
U.S. Appl. No. 12/059,916, filed Mar. 31, 2008, Office Action, Mar. 15, 2012.
U.S. Appl. No. 11/656,592, filed Jan. 22, 2007, Final Office Action, Feb. 28, 2012.
U.S. Appl. No. 12/423,933, filed Apr. 15, 2009, Office Action, Jun. 21, 2012.
U.S. Appl. No. 12/166,999, filed Jul. 2, 2008, Office Action, Jun. 6, 2012.

* cited by examiner

APPROACH FOR PROCESSING LOCKED PRINT JOBS OBTAINED FROM OTHER PRINTING DEVICES

RELATED APPLICATION DATA

This application is related to U.S. patent application Ser. No. 11/411,248, entitled APPROACH FOR IMPLEMENTING LOCKED PRINTING WITH REMOTE UNLOCK ON PRINTING DEVICES, filed Apr. 25, 2006, U.S. patent application Ser. No. 11/346,479, entitled APPROACH FOR IMPLEMENTING LOCKED PRINTING ON PRINTING DEVICES, filed Feb. 1, 2006, and U.S. patent application Ser. No. 11/788,517, entitled APPROACH FOR IMPLEMENTING LOCKED PRINTING WITH UNLOCK VIA A KEYPAD, filed Apr. 20, 2007, the contents all of which are incorporated by reference in their entirety for all purposes as if fully set forth herein.

FIELD OF THE INVENTION

This invention relates generally to processing of print jobs on printing devices.

BACKGROUND

The approaches described in this section are approaches that could be pursued, but not necessarily approaches that have been previously conceived or pursued. Therefore, unless otherwise indicated, the approaches described in this section may not be prior art to the claims in this application and are not admitted to be prior art by inclusion in this section.

Some printing devices are configured with a feature known as "locked printing" to provide control over the printing of electronic documents. When the locked printing feature is enabled and a print job is sent to the printing device, processing of the print job is deferred until a user enters authentication data at the printing device and the authentication data is verified. The authentication data typically includes a user ID and/or password, although many different types of authentication data may be used. A user conventionally enters the authentication data through an operation panel on the printing device and the printing device verifies the authentication data. Once the authentication data is successfully verified, the printing device allows the print job to be processed, i.e., allows a printed version of the electronic document reflected in the print job to be generated.

One of the problems with conventional locked printing approaches is that a locked print job can only be processed at the printing device to which the print job was originally sent. Users cannot print locked print jobs at other printing devices. This can be very inconvenient, for example, in situations where a printing device cannot currently process print jobs for any of a variety of reasons. For example, a printing device may not be able to currently process print jobs because the printing device has exhausted a supply of consumable resources, such as paper, toner, staples, other finishing materials. In these situations, users must wait for the depleted consumables to be replenished before their print job can be processed. As another example, the printing device may not be able to currently process print jobs because an error occurred at the printing device, such as a paper jam or a mechanical failure.

SUMMARY

An approach is provided for processing print data on printing devices. According to one embodiment of the invention, an approach is provided for remotely processing locked print jobs on other printing devices. A printing device is configured to discover other printing devices on a network that have locked print jobs stored on them. A user enters user identification data into the printing device via a user interface and the printing device displays the locked print jobs stored on the other printing devices that are associated with the user. The user selects a particular locked print job and the printing device requests the particular locked print job from the printing device on which the locked print job is stored. The printing device then processes the locked print job locally. This approach allows a user to process locked print jobs that are stored at remote printing devices on a printing device that is local to the user. According to another embodiment of the invention, an approach is provided for a printing device to forward print jobs to other printing devices. In this embodiment, a printing device is configured to discover other printing devices on a network and the printing attributes of the discovered printing devices. The printing device receives and stores a print job and determines another printing device that is capable of processing the print job based upon the discovered attributes of the other printing devices on the network. The printing device forwards the print job to one or more of the discovered printing devices that are capable of processing the print job and the print job is processed by those printing devices. This allows the printing device to forward print jobs to other printing devices for processing, for example when the printing device has a backlog of print jobs or otherwise cannot process the print job.

BRIEF DESCRIPTION OF THE DRAWINGS

In the figures of the accompanying drawings like reference numerals refer to similar elements.

DETAILED DESCRIPTION

In the following description, for the purposes of explanation, numerous specific details are set forth in order to provide a thorough understanding of the present invention. It will be apparent, however, to one skilled in the art that the present invention may be practiced without these specific details. In other instances, well-known structures and devices are shown in block diagram form in order to avoid unnecessarily obscuring the present invention. Various aspects of the invention are described hereinafter in the following sections:

I. OVERVIEW
    II. ARCHITECTURE OVERVIEW
    III. REMOTE PROCESSING OF LOCKED PRINT JOBS ON OTHER PRINTING DEVICES

IV. FORWARDING OF PRINT JOBS TO OTHER PRINTING DEVICES
V. IMPLEMENTATION MECHANISMS

I. Overview

An approach is provided for processing print data on printing devices. According to one embodiment of the invention, an approach is provided for remotely processing locked print jobs on other printing devices. A printing device is configured to discover other printing devices on a network that have locked print jobs stored on them. A user enters user identification data into the printing device via a user interface and the printing device displays the locked print jobs stored on the other printing devices that are associated with the user. The user selects a particular locked print job and the printing device requests the particular locked print job from the printing device on which the locked print job is stored. The printing device then processes the locked print job locally. This approach allows a user to process locked print jobs that are stored at remote printing devices on a printing device that is local to the user. According to another embodiment of the invention, an approach is provided for a printing device to forward print jobs to other printing devices. In this embodiment, a printing device is configured to discover other printing devices on a network and the printing attributes of the discovered printing devices. The printing device receives and stores a print job and determines another printing device that is capable of processing the print job based upon the discovered attributes of the other printing devices on the network. The printing device forwards the print job to one or more of the discovered printing devices that are capable of processing the print job and the print job is processed by those printing devices. This allows the printing device to forward print jobs to other printing devices for processing, for example when the printing device has a backlog of print jobs or otherwise cannot process the print job.

II. Architecture Overview

Figure 1:
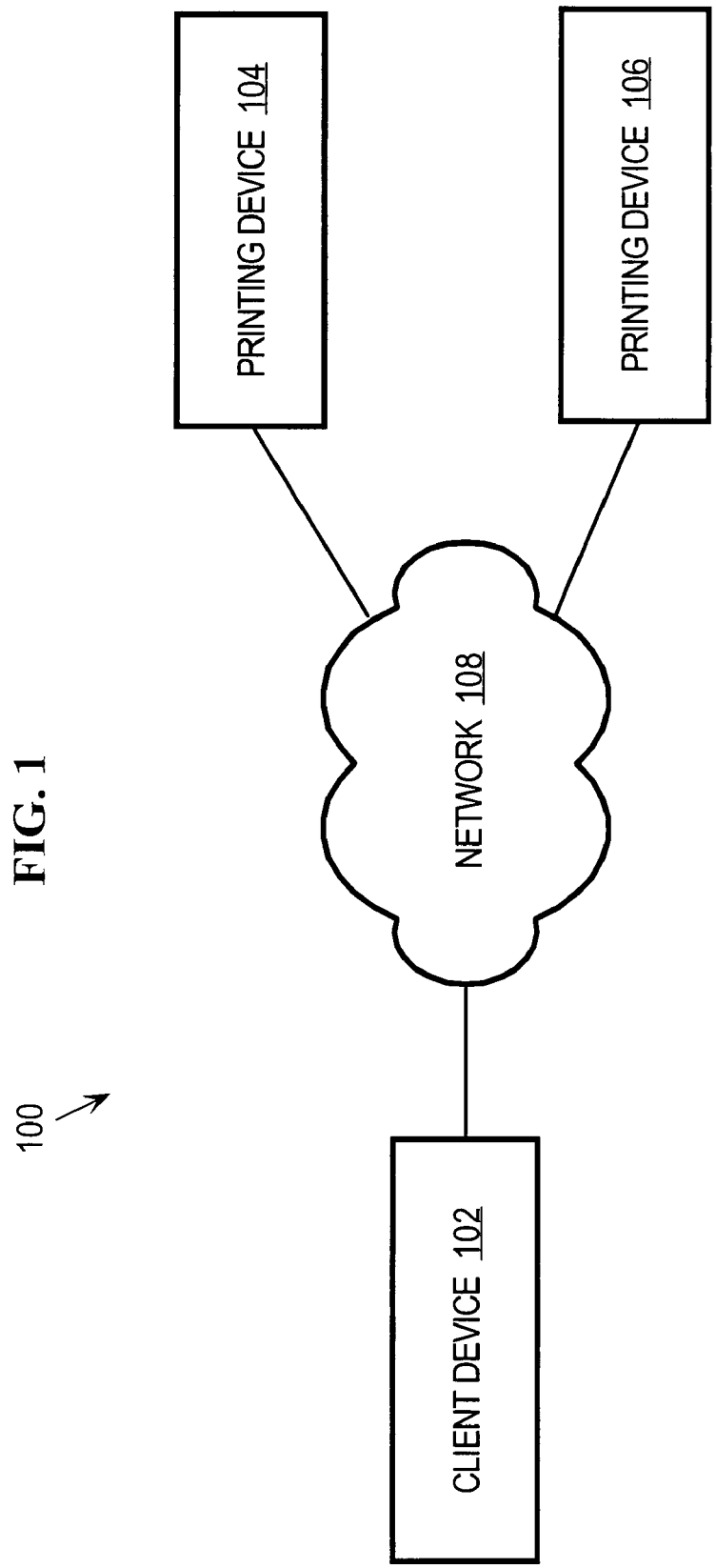
FIG. 1 is a block diagram that depicts an arrangement for processing print data on printing devices, according to an embodiment of the invention.

FIG. 1 is a block diagram that depicts an arrangement 100 for processing print data on printing devices, according to an embodiment of the invention. Arrangement 100 includes a client device 102, a printing device 104 and a printing device 106 that are communicatively coupled via a network 108. Network 108 may be implemented with any type of medium and/or mechanism that facilitates the wireless exchange of information between client device 102 and printing devices 104, 106. Furthermore, network 108 may use any type of communications protocol and may be secured or unsecured, depending upon the requirements of a particular application. Client device 102 and printing devices 104, 106 may also have direct communications links that are not depicted in the figures or described herein for purposes of brevity.

Client device 102 may be implemented by any type of client devices. Example implementations of client device 102 include, without limitation, workstations, personal computers, laptop computers, personal digital assistants (PDAs), cellular telephony devices and any type of mobile devices. Client device 102 may be configured with an application, such as a word processor, a spreadsheet program or an email client, and a print driver for generating print data. The application and printer driver conventionally operate together to generate and provide a print job to printing devices 104, 106. Client device 102 may be configured with other mechanisms, processes and functionality, depending upon a particular implementation, that are not depicted in the figures or described herein for purposes of brevity.

Printing devices 104, 106 may be implemented by any type of device that is capable of processing print jobs received from client device 102 and generate printed versions of electronic documents reflected in the print jobs. Examples of printing devices 104, 106 include, without limitation, printers, copiers, multi-function peripherals (MFPs).

Figure 2:
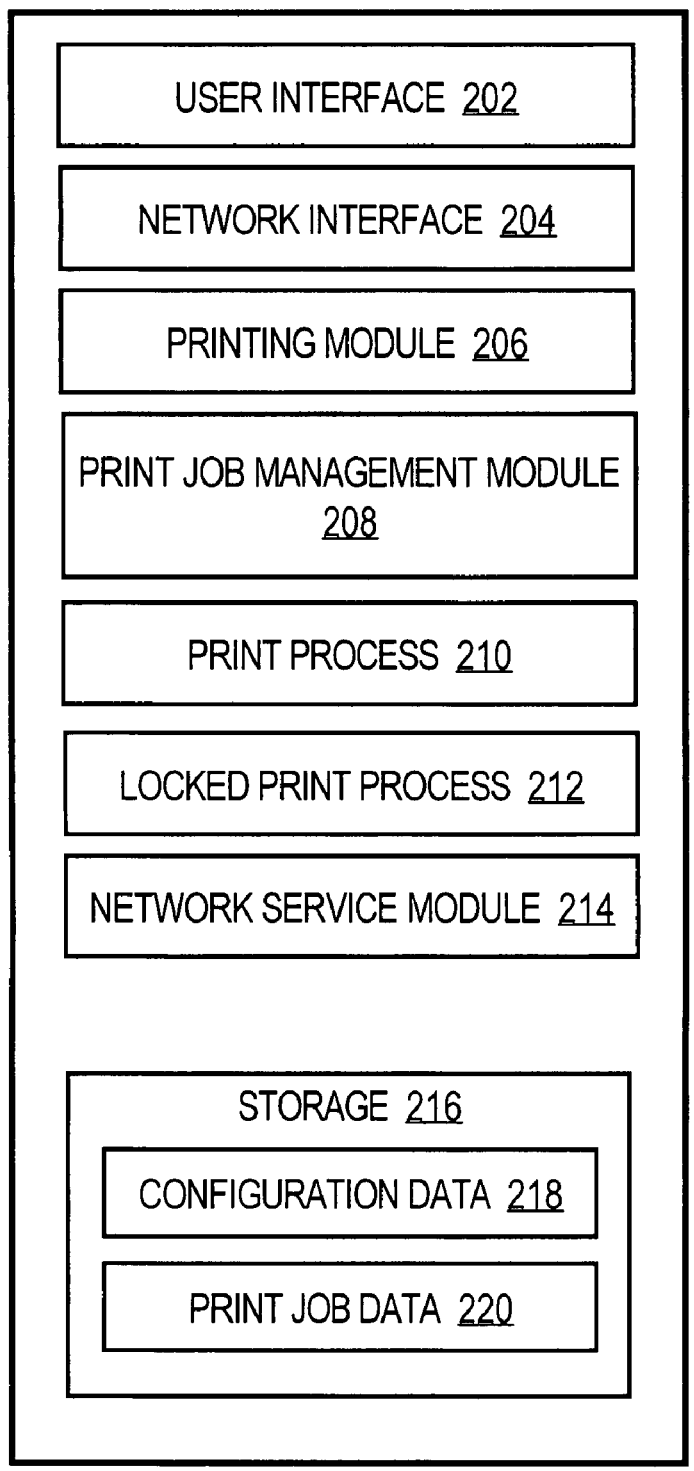
FIG. 2 is a block diagram that depicts an example printing device according to one embodiment of the invention.

FIG. 2 is a block diagram that depicts an example printing device 200 according to one embodiment of the invention. The invention is not limited to printing devices having the particular elements depicted in FIG. 2 and the elements depicted therein are for explanation purposes. The example printing device 200 includes a user interface, a network interface 204, a printing module 206, a print job management module 208, a print process 210, a locked print process 212, a network service module 214 and storage 216. Printing device 200 may be configured with other mechanisms, modules, processes and functionality, depending upon a particular implementation, and the approach described herein for processing print data on printing devices is not limited to printing devices having the specific elements depicted in FIG. 2 and may also have fewer elements than depicted in FIG. 2. For example, printing device 200 may be a multi-function peripheral (MFP) that includes any combination of printing, copying, facsimile and scanning capability, etc.

User interface 202 may be any mechanism and/or medium that provides for the exchange of information between a user and printing device 200. Examples of user interface 202 include, without limitation, a control panel having a display and keypad or keyboard, a cathode ray tube (CRT), a liquid crystal display (LCD), a keyboard, touchpad, mouse, trackball, a microphone and speakers, and any combination thereof. Printing device 200 may be configured to display information on user interface 202 in any number of languages, depending upon a particular implementation. As with conventional printing devices, the user interface 202 on printing device 104 may provide the capability to select particular functions and enter alphanumeric strings.

Network interface 204 may be implemented by any mechanism that allows printing device 200 to communicate with a network. Examples of network interface 204 include, without limitation, a wired or wireless network interface card.

Printing module 206 may be implemented by any mechanism and/or processes that are capable of processing print data and generating a printed version of an electronic document contained in the print data. Thus, printing module 206 may include various hardware elements typically found in printing devices for generating printed documents, such as fusers, rollers, etc. Printing module 206 may also include any software processes that interoperate with the hardware elements to provide for the printing of electronic documents.

Print job management module 208 performs various functions relating to the management of print jobs as described in more detail hereinafter. Print process 210 may be implemented by one or more processes for processing print data received from client device 102 and for causing printing module 206 to generate a printed version of an electronic document reflected in the print data. Locked print process 212 is one or more processes configured to provide locked print services. For example, locked print process 212 may be configured to only allow print data received by printing device 200 that has been designated for locked printing to be printed after a user has been authenticated. This may include, for example, a user entering a user identification and password via user interface 202 that are verified.

Network service module 214 is one or more processes configured to provide various services relating to the processing of print data on printing device 200 as described in more detail hereinafter.

Storage 120 may be implemented by any type of storage, including volatile and non-volatile storage. Examples of storage 120 include, without limitation, random access memory (RAM) and one or more disks. Storage 120 may store different types of data, for example, print job data 122. In the present example, storage 120 includes configuration data 218 and print job data 220.

Any and all of the elements of printing device 200 just described may be implemented in hardware, software, or any combination of hardware or software, depending upon a particular implementation.

III. Remote Processing of Locked Print Jobs on Other Printing Devices

According to one embodiment of the invention, an approach is provided for remotely processing locked print jobs on others printing devices. The approach allows locked print jobs to be processed on printing devices other than the printing devices where the locked print jobs were initially sent for processing. This is particularly useful in situations where a user has sent locked print jobs to remote printing devices and desires to process those print jobs on a printing device that is local to the user.

Figure 3:
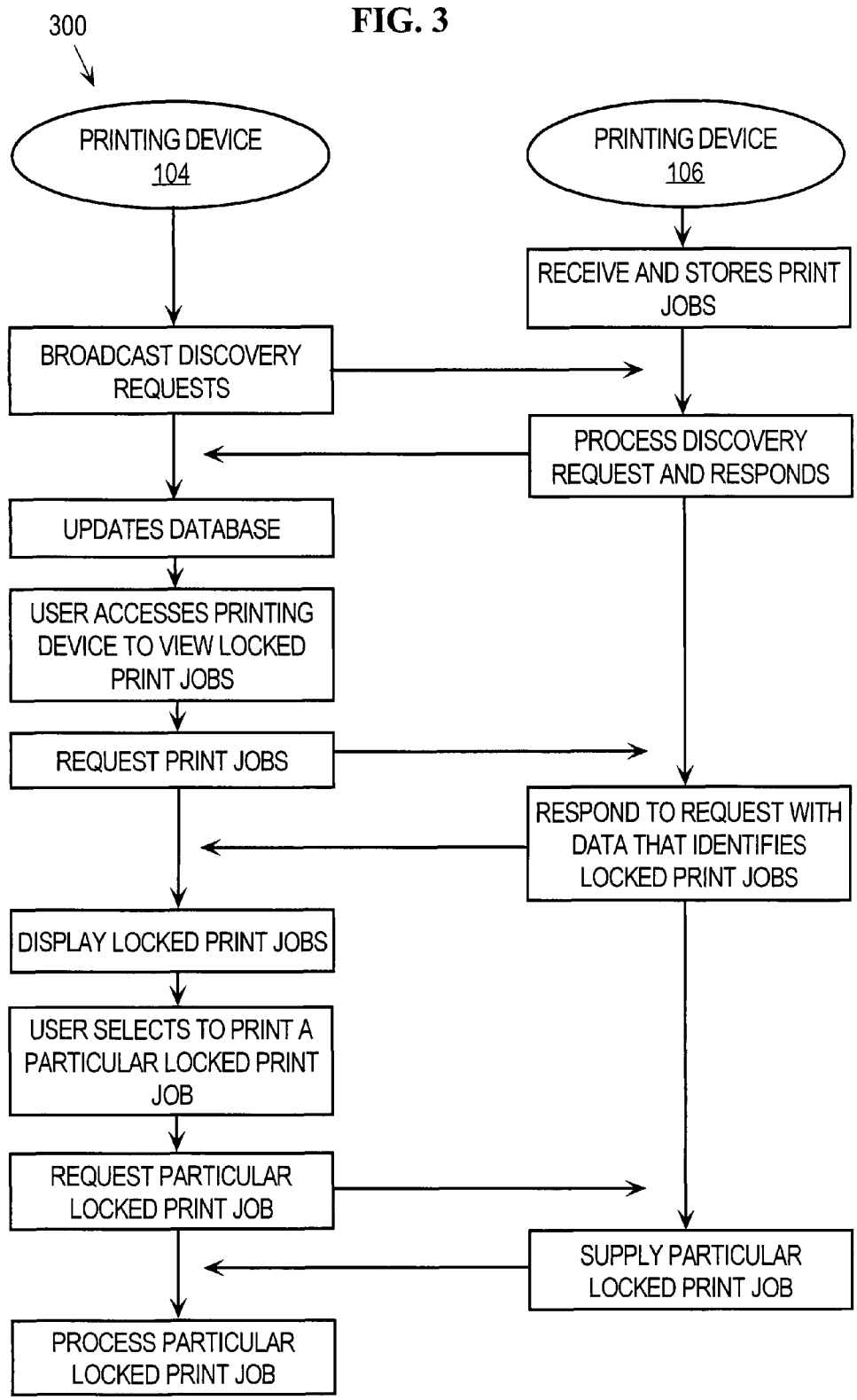
FIG. 3 is a flow diagram that depicts an approach for remotely processing locked print jobs on other print devices according to one embodiment of the invention.

FIG. 3 is a flow diagram that depicts an approach for remotely processing locked print jobs on other print devices according to one embodiment of the invention. FIG. 3 depicts the interaction between two printing devices 104 and 106 over time, starting from the top and working towards the bottom. Although the process is depicted in FIG. 3 and described herein in the context of two printing devices, the invention is not limited to this context and is applicable to any number of printing devices.

The process begins with printing device 106 receiving and storing print jobs in accordance with conventional locked printing. For example, printing device receives print jobs from client devices, such as client device 102, and stores the print jobs that are designated for locked printing. A print job may be designated for locked printing based upon data contained in the print job. For example, suppose that a user of client device 102 generates a word processing document using a word processing application executing on client device 102. When the user is ready to print the word processing document, the user specifies that printing device 106 is to be used to print the word processing document and that locked printing is to be used. The word processing application, in conjunction with a print driver, generates a locked print job based upon the word processing document. The locked print job specifies that locked printing is to be used to process the locked print job at a printing device. The locked print job is then transmitted to printing device 106.

Sometime later, printing device 104 performs discovery of other printing devices that might have locked print jobs. To accomplish this, printing device 104 generates and transmits one or more discovery request messages over network 108. The discovery request messages request that available printing devices on network 108 identify themselves to printing device 104. One example of a discovery request message is a broadcast discovery request message. As indicated by FIG. 3, in response to receiving and processing the discovery request message, printing device 106 generates and transmits a response to printing device 104. The response may include information that identifies printing device 106. The response may also include other information about printing device 106, such as one or more characteristics of printing device 106.

Printing device 104 updates a database of information about other printing devices available on network 108 that support locked printing. This may include, for example, updating data stored on storage 216. Sometime later, a user accesses printing device 104 to view locked print jobs. According to one embodiment of the invention, a user selects an option via user interface 202 to view locked print jobs and the user is queried for user identification data that identifies the user. For example, the user may be queried for a user ID. The user may also be queried for user authentication data that may be used to authenticate the user, such as a password. The password may be verified locally by printing device 104, or may be verified remotely via a server over network 108.

In response to detecting the user's request to view locked print jobs and the user entering their user identification data, and also the user authentication data being authenticated if applicable, printing device 104 generates a request for locked print jobs and transmits the request to printing devices on network 108 that support locked printing. In the present example, print device 104 transmits the request to printing device 106. One example form of the request is a unicast message. Printing device 106 processes the request and generates a response that indicates locked print jobs stored on printing device 106.

Printing device 104 then displays data on user interface 202 that indicates the locked print jobs stored on printing device 106. The locked print jobs may be displayed in any form, for example a list. The locked print jobs may include locked print jobs from any number of printing devices and may include locked print jobs stored on printing device 104. The data may be displayed with information that indicates where the locked print jobs are located. For example, the locked print jobs may be displayed in a list on user interface and the list may include data, for example the name of the printing device where each locked print job is stored. The list may include other information, such as the location of each printing device as well as a current status of each printing device.

The user then selects for printing a particular locked print job from the print jobs displayed on user interface 202. For example, the user may use a touch pad or cursor and enter keys to select the particular locked print job. In response to the user selecting the particular locked print job, printing device 104 generates and transmits a request for the particular locked print job to printing device 106 over network 108.

In response to this request, printing device 106 supplies the particular print job to printing device 104 via network 108. Printing device 106 may supply the particular print job in a compressed form to reduce the amount of data transmitted over network 108. Printing device 106 may also supply the particular print job in a protected form, e.g., in an encrypted form. Finally, printing device 104 then processes the particular print job. The approach allows a user to use any printing device to browse and process locked print jobs stored on other printing devices connected to the network, regardless of whether the other printing devices are currently able to process locked print jobs.

IV. Forwarding of Print Jobs to Other Printing Devices

According to one embodiment of the invention, an approach is provided for a printing device to forward a print job to another printing device for processing. This approach allows a printing device to forward a print job to another printing device for processing in situations where it is advantageous to do so. For example, the printing device may not have the capabilities to process the print job. As another example, the printing device may currently be low on consumables or have an error condition that prevents the printing device from currently processing the print job.

Figure 4:
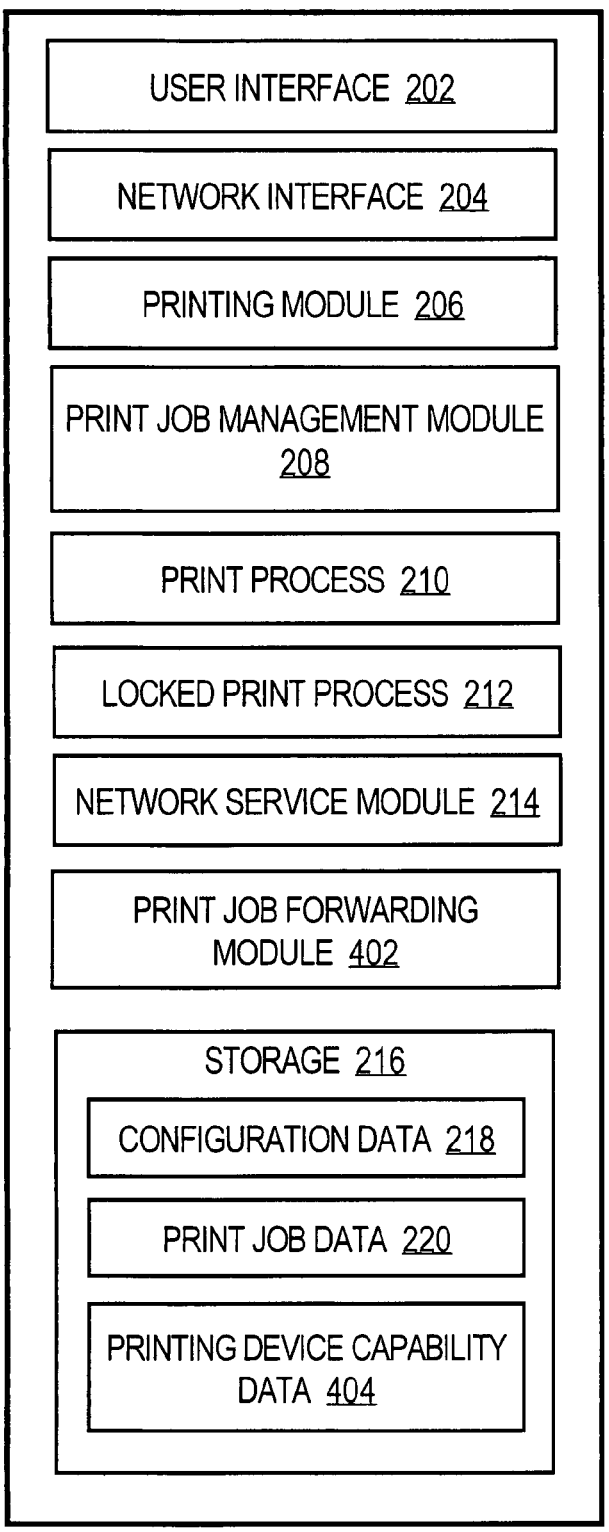
FIG. 4 is a block diagram that depicts an example printing device configured to forward print jobs to other printing jobs according to one embodiment of the invention.

FIG. 4 is a block diagram that depicts an example printing device 400 configured to forward print jobs to other printing jobs according to one embodiment of the invention. For purposes of explanation only, printing device 400 includes the elements of the printing device 200 depicted in FIG. 2. In addition, printing device 400 includes a print job forwarding module 402 and printing device capability data 404 stored on storage 216.

Figure 5:
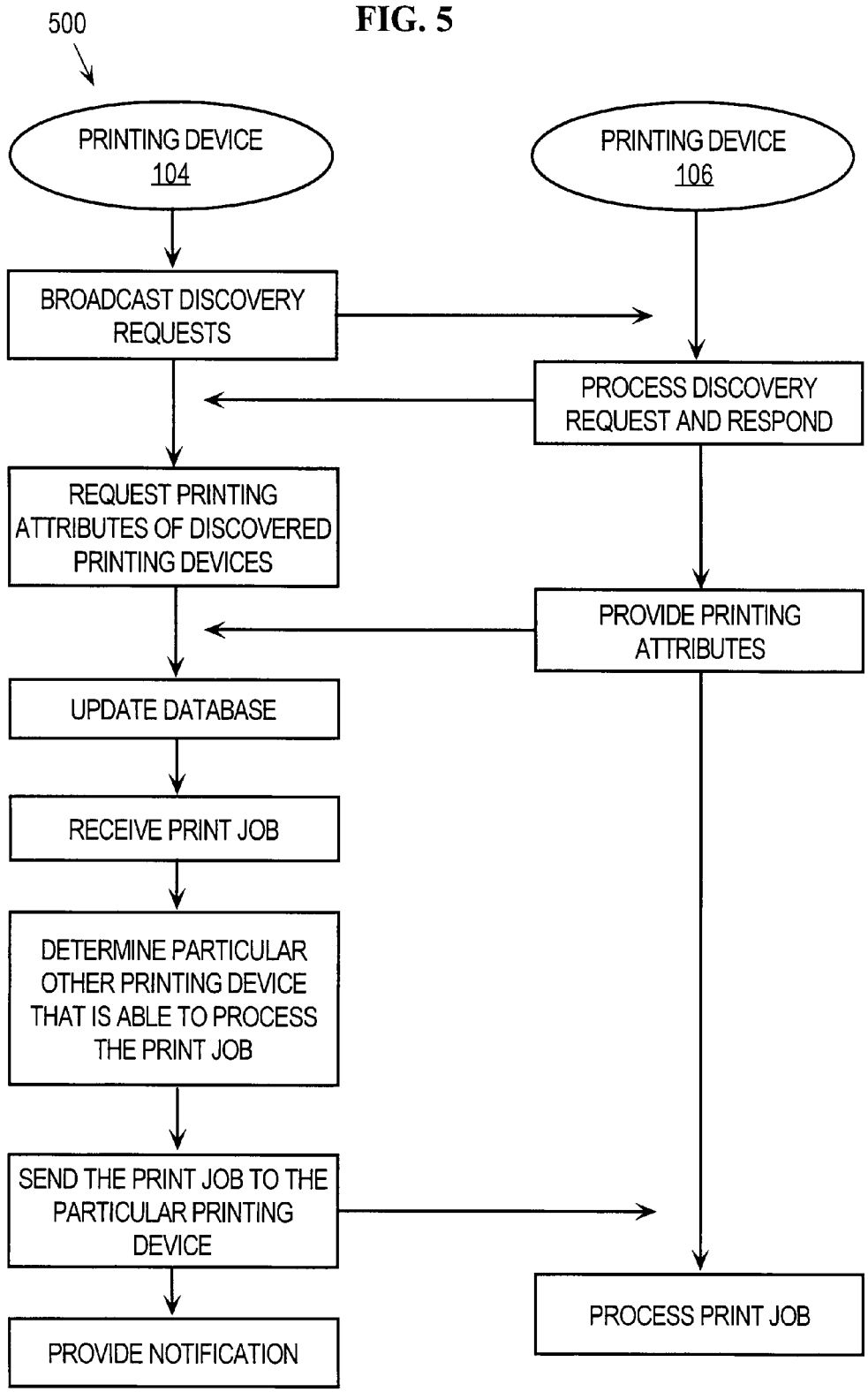
FIG. 5 is a flow diagram that depicts an approach for a printing device to forward a print job to another printing device for processing according to one embodiment of the invention.

FIG. 5 is a flow diagram that depicts an approach for a printing device to forward a print job to another printing device for processing according to one embodiment of the invention. FIG. 5 depicts the interaction between two printing devices 104 and 106 over time, starting from the top and working towards the bottom. Although the process is depicted in FIG. 5 and described herein in the context of two printing devices, the invention is not limited to this context and is applicable to any number of printing devices.

The process begins with printing device 104 performing discovery of other printing devices available on network 108. In response to receiving and processing the discovery request message, printing device 106 generates and transmits a response to printing device 104. The response may include information that identifies printing device 106. Printing device 104 then queries printing device 106 to request the printing attributes of printing device 106. The printing attributes may include a wide variety of printing attributes and the invention is not limited to any particular printing attributes. Example printing attributes include, without limitation, print media type, such as paper and transparencies, paper size, paper type, paper color, print color options, finishing options, such as stapling, folding, hole punching, binding, coating, or any other installed options. Printing device 106 responds to printing device 104 to provide its printing attributes. Printing device 104 updates a database of information about the printing attributes of printing device 106. Printing device 104 may also update the database to indicate the printing attributes of other printing devices that printing device 104 has discovered. For example, printing device 104 generates and stores printing device capability data 404 on storage 216.

Sometime later, printing device 104 receives a print job, for example from client device 102. Printing device 104 stores the print job on storage 216. Printing device 104 determines another printing device on network 108 that is capable of processing the print job and forwards the print job to that printing device. For example, print job forwarding module 402 may determine, based upon printing device capability data 404, that printing device 106 is capable of processing the print job and then forwards the print job to printing device 106. The print job may be compressed and/or encrypted prior to forwarding to printing device 106 to reduce the amount of data transferred over network 108 and to provide enhanced security. This functionality may be specified by configuration data 218, either at printing device 200 or remotely, for example by an administrator.

Printing device 106 processes the print job and printing device 104 optionally provides a notification. For example, printing device 104 may generate and transmit a message to client device 102 to indicate that the print job has been forwarded to printing device 106. This allows a user to be notified that the print job will be processed at a different printing device than the original printing device to which the user sent the print job for processing. Printing device 104 may also provide a notification on user interface 202 of printing device 104 so that if the user did not receive the notification sent to client device 102 and is expecting the print job to be processed at printing device 104, the user would see from the user interface 202 that the print job had been forwarded to printing device 106.

The decision for a printing device to forward a print job to another printing device for processing may be made for a wide of variety of reasons. For example, a printing device may not be configured to process a print job. One example scenario is if the print job requires color printing and the printing device does not support color printing. A printing device also may not be able to process a print job because the printing device is low on consumables, has experienced an error or is offline for service. Other considerations may also be used in the decision, for example the current load or backlog of printing jobs at a particular printing device. The approach allows a printing device to make the decision of when to forward a print job to another printing device and which printing device the print job is to be forwarded to.

V. Implementation Mechanisms

Figure 6:
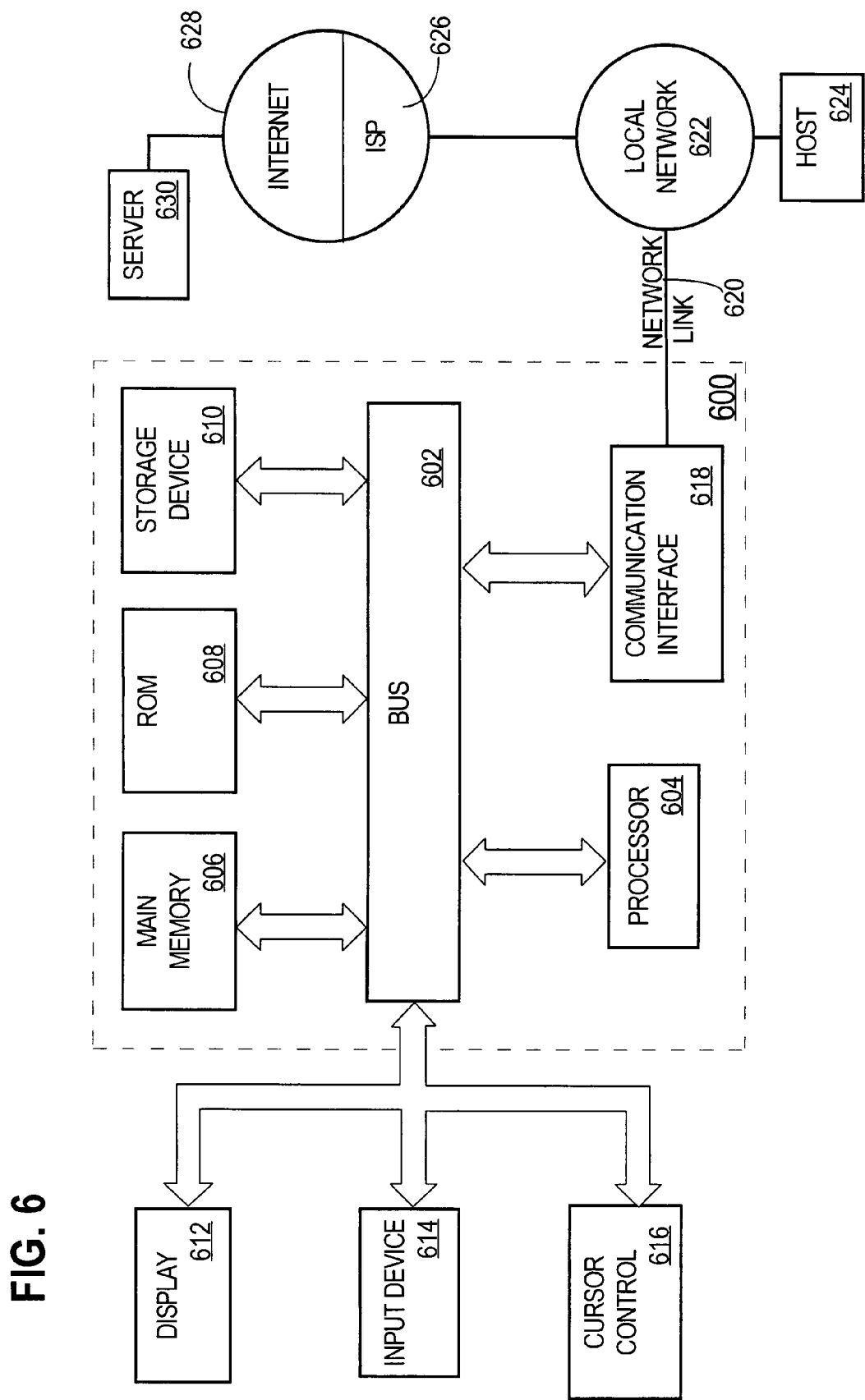
FIG. 6 is a block diagram of a computer system on which embodiments of the invention may be implemented.

The approach described herein for implementing locked printing with unlock via a keypad attached to the printing device via an interface remote unlock may be implemented on any type of computing platform or architecture. For purposes of explanation, FIG. 6 is a block diagram that depicts an example computer system 600 upon which embodiments of the invention may be implemented. Computer system 600 includes a bus 602 or other communication mechanism for communicating information, and a processor 604 coupled with bus 602 for processing information. Computer system 600 also includes a main memory 606, such as a random access memory (RAM) or other dynamic storage device, coupled to bus 602 for storing information and instructions to be executed by processor 604. Main memory 606 also may be used for storing temporary variables or other intermediate information during execution of instructions to be executed by processor 604. Computer system 600 further includes a read only memory (ROM) 608 or other static storage device coupled to bus 602 for storing static information and instructions for processor 604. A storage device 610, such as a magnetic disk or optical disk, is provided and coupled to bus 602 for storing information and instructions.

Computer system 600 may be coupled via bus 602 to a display 612, such as a cathode ray tube (CRT), for displaying information to a computer user. An input device 614, including alphanumeric and other keys, is coupled to bus 602 for communicating information and command selections to processor 604. Another type of user input device is cursor control 616, such as a mouse, a trackball, or cursor direction keys for communicating direction information and command selections to processor 604 and for controlling cursor movement on display 612. This input device typically has two degrees of freedom in two axes, a first axis (e.g., x) and a second axis (e.g., y), that allows the device to specify positions in a plane.

The invention is related to the use of computer system 600 for implementing the techniques described herein. According to one embodiment of the invention, those techniques are performed by computer system 600 in response to processor 604 executing one or more sequences of one or more instructions contained in main memory 606. Such instructions may be read into main memory 606 from another computer-readable medium, such as storage device 610. Execution of the sequences of instructions contained in main memory 606 causes processor 604 to perform the process steps described herein. In alternative embodiments, hard-wired circuitry may be used in place of or in combination with software instructions to implement the invention. Thus, embodiments of the invention are not limited to any specific combination of hardware circuitry and software.

The term "computer-readable medium" as used herein refers to any medium that participates in providing data that causes a computer to operation in a specific manner. In an embodiment implemented using computer system 600, various computer-readable media are involved, for example, in providing instructions to processor 604 for execution. Such a medium may take many forms, including but not limited to, non-volatile media and volatile media. Non-volatile media includes, for example, optical or magnetic disks, such as storage device 610. Volatile media includes dynamic memory, such as main memory 606. Common forms of computer-readable media include, for example, a floppy disk, a flexible disk, hard disk, magnetic tape, or any other magnetic medium, a CD-ROM, any other optical medium, a RAM, a PROM, and EPROM, a FLASH-EPROM, any other memory chip or memory cartridge, or any other medium from which a computer can read.

Various forms of computer-readable media may be involved in carrying one or more sequences of one or more instructions to processor 604 for execution. For example, the instructions may initially be carried on a magnetic disk of a remote computer. The remote computer can load the instructions into its dynamic memory and send the instructions over a telephone line using a modem. A modem local to computer system 600 can receive the data on the telephone line and use an infra-red transmitter to convert the data to an infra-red signal. An infra-red detector can receive the data carried in the infra-red signal and appropriate circuitry can place the data on bus 602. Bus 602 carries the data to main memory 606, from which processor 604 retrieves and executes the instructions. The instructions received by main memory 606 may optionally be stored on storage device 610 either before or after execution by processor 604.

Computer system 600 also includes a communication interface 618 coupled to bus 602. Communication interface 618 provides a two-way data communication coupling to a network link 620 that is connected to a local network 622. For example, communication interface 618 may be an integrated services digital network (ISDN) card or a modem to provide a data communication connection to a corresponding type of telephone line. As another example, communication interface 618 may be a local area network (LAN) card to provide a data communication connection to a compatible LAN. Wireless links may also be implemented. In any such implementation, communication interface 618 sends and receives electrical, electromagnetic or optical signals that carry digital data streams representing various types of information.

Network link 620 typically provides data communication through one or more networks to other data devices. For example, network link 620 may provide a connection through local network 622 to a host computer 624 or to data equipment operated by an Internet Service Provider (ISP) 626. ISP 626 in turn provides data communication services through the world wide packet data communication network now commonly referred to as the "Internet" 628. Local network 622 and Internet 628 both use electrical, electromagnetic or optical signals that carry digital data streams.

Computer system 600 can send messages and receive data, including program code, through the network(s), network link 620 and communication interface 618. In the Internet example, a server 630 might transmit a requested code for an application program through Internet 628, ISP 626, local network 622 and communication interface 618. The received code may be executed by processor 604 as it is received, and/or stored in storage device 610, or other non-volatile storage for later execution.

In the foregoing specification, embodiments of the invention have been described with reference to numerous specific details that may vary from implementation to implementation. Thus, the sole and exclusive indicator of what is, and is intended by the applicants to be, the invention is the set of claims that issue from this application, in the specific form in which such claims issue, including any subsequent correction. Hence, no limitation, element, property, feature, advantage or attribute that is not expressly recited in a claim should limit the scope of such claim 1n any way. The specification and drawings are, accordingly, to be regarded in an illustrative rather than a restrictive sense.

What is claimed is:

1. A printing device comprising:
    a user interface configured to exchange information between one or more users and the printing device;
    a network interface for communicatively coupling the printing device to network;
    a printing module for generating printed versions of electronic documents;
    a print job management module configured to store at the printing device one or more print jobs received by the printing device over the network;
    a print process configured to process the one or more print jobs and cause printed versions of electronic documents contained in the one or more print jobs to be generated at the printing device by the printing module; and
    a network service module configured to:
        perform device discovery to discover one or more other printing devices communicatively coupled to the network by generating and transmitting over the network to a plurality of network devices a broadcast discovery request message,
        determine one or more locked print jobs stored on the one or more other printing devices,
        cause locked print job identification data to be displayed on the user interface that identifies the one or more locked print jobs stored on the one or more other printing devices,
        in response to detection of user input via the user interface that indicates a user selection for printing of a particular locked print job from the one or more locked print jobs,
            generate and transmit a request for the particular locked print job to a particular printing device from the one or more other printing devices, wherein the particular locked print job is stored on the particular printing device, and
            in response to receiving the particular locked print job from the particular printing device, causing the particular locked print job to be processed by the print process at the printing device to cause a printed version of an electronic document contained in the particular locked print job to be printed at the printing device by the printing module.

2. The printing device as recited in claim 1, wherein the network service module is further configured to receive, over the network from the one or more other printing devices, one or more responses that indicate one or more capabilities of the one or more printing device and store data that specifies the one or more capabilities of the one or more printing devices.

3. The printing device as recited in claim 1, wherein the printing device is further configured to:
    query the user for user identification data and user authentication data via the user interface, and
    verify the user identification data and the user authentication data.

4. The printing device as recited in claim 1, wherein:
    the printing device is further configured to query the user for user identification data via the user interface, and
    the network service module is further configured to request from the one or more other printing devices data that identifies locked print jobs stored on the one or more other printing devices that are associated with the user identification data.

5. The printing device as recited in claim 1, wherein the job management module is further configured to:
  decompress the particular locked print job received from the particular printing device and generate a decompressed locked print job, and
  cause the decompressed locked print job to be processed by the print process.

6. The printing device as recited in claim 1, wherein the job management module is further configured to:
  decrypt the particular locked print job received from the particular printing device and generate a decrypted locked print job, and
  cause the decrypted locked print job to be processed by the print process.

7. The printing device as recited in claim 1, wherein the network service module is further configured to cause location data to be displayed on the user interface, wherein the location data identifies a printing device where each of the one or more locked print jobs is currently stored.

8. A non-transitory computer-readable medium storing instructions which, when processed by one or more processors cause:
  a network service module on a printing device to:
    perform device discovery to discover one or more other printing devices communicatively coupled to a network by generating and transmitting over the network to a plurality of network devices a broadcast discovery request message,
    determine one or more locked print jobs stored on the one or more other printing devices,
    cause locked print job identification data to be displayed on a user interface of the printing device that identifies the one or more locked print jobs stored on the one or more other printing devices,
    in response to detection of user input via the user interface that indicates a user selection for printing of a particular locked print job from the one or more locked print jobs,
      generate and transmit a request for the particular locked print job to a particular printing device from the one or more other printing devices, wherein the particular locked print job is stored on the particular printing device, and
      in response to receiving the particular locked print job from the particular printing device, causing the particular locked print job to be processed by the print process at the printing device to cause a printed version of an electronic document contained in the particular locked print job to be printed at the printing device by the printing module.

9. The non-transitory computer-readable medium as recited in claim 8, further storing additional instructions which, when processed by one or more processors, cause the network service module to receive, over the network from the one or more other printing devices, one or more responses that indicate one or more capabilities of the one or more printing device and store data that specifies the one or more capabilities of the one or more printing devices.

10. The non-transitory computer-readable medium as recited in claim 8, further storing additional instructions which, when processed by one or more processors, cause the printing device to:
  query the user for user identification data and user authentication data via the user interface, and
  verify the user identification data and the user authentication data.

11. The non-transitory computer-readable medium as recited in claim 8, further storing additional instructions which, when processed by one or more processors, cause:
  the printing device to query the user for user identification data via the user interface, and
  the network service module to request from the one or more other printing devices data that identifies locked print jobs stored on the one or more other printing devices that are associated with the user identification data.

12. The non-transitory computer-readable medium as recited in claim 8, further storing additional instructions which, when processed by one or more processors, cause a job management module on the printing device to:
  decompress the particular locked print job received from the particular printing device and generate a decompressed locked print job, and
  cause the decompressed locked print job to be processed by the print process.

13. The non-transitory computer-readable medium as recited in claim 8, further storing additional instructions which, when processed by one or more processors, cause a job management module on the printing device to:
  decrypt the particular locked print job received from the particular printing device and generate a decrypted locked print job, and
  cause the decrypted locked print job to be processed by the print process.

14. The non-transitory computer-readable medium as recited in claim 8, further storing additional instructions which, when processed by one or more processors, cause the network service module to cause location data to be displayed on the user interface, wherein the location data identifies a printing device where each of the one or more locked print jobs is currently stored.

* * * * *